(12) United States Patent
Zimmermann et al.

(10) Patent No.: US 9,733,081 B2
(45) Date of Patent: Aug. 15, 2017

(54) GEODESIC MEASURING DEVICE COMPRISING A THERMOGRAPHIC CAMERA

(75) Inventors: Jan Zimmermann, Speicherschwendi (CH); Norbert Kotzur, Altstätten (CH); Bernd Möller, Lüchingen (CH); Stefan Sieber, Widnau (CH); Vincent Legrand, Persan (FR)

(73) Assignee: LEICA GEOSYSTEMS AG, Heerbrugg (CH)

( * ) Notice: Subject to any disclaimer, the term of this patent is extended or adjusted under 35 U.S.C. 154(b) by 540 days.

(21) Appl. No.: 13/978,737

(22) PCT Filed: Jan. 10, 2012

(86) PCT No.: PCT/EP2012/050302
§ 371 (c)(1),
(2), (4) Date: Jul. 9, 2013

(87) PCT Pub. No.: WO2012/095417
PCT Pub. Date: Jul. 19, 2012

(65) Prior Publication Data
US 2013/0278759 A1    Oct. 24, 2013

(30) Foreign Application Priority Data

Jan. 10, 2011  (EP) .................... 11150516

(51) Int. Cl.
*G01C 1/04* (2006.01)
*G01C 15/00* (2006.01)
(Continued)

(52) U.S. Cl.
CPC .............. *G01C 15/00* (2013.01); *G01C 1/04* (2013.01); *G01C 7/00* (2013.01); *G01C 15/06* (2013.01)

(58) Field of Classification Search
None
See application file for complete search history.

(56) References Cited

U.S. PATENT DOCUMENTS 3,471,234 A * 10/1969 Studebaker .......... G01C 15/004
33/285
4,086,841 A *  5/1978 MacDonald ............. B64D 1/04
235/401
(Continued)

FOREIGN PATENT DOCUMENTS

CA   1 229 675 A1  11/1987
CN     1761855 A    4/2006
(Continued)

OTHER PUBLICATIONS

European Search Report dated Jun. 16, 2011 as received in application No. EP 11 15 0516.

*Primary Examiner* — Jay Patel
*Assistant Examiner* — Shadan E Haghani
(74) *Attorney, Agent, or Firm* — Maschoff Brennan

(57) ABSTRACT

Method for determining, with geodesic precision, the position of a target point on a target object by using a geodesic measuring device, said method comprising a sighting device which comprises at least one objective unit that defines an optical line of sight, an electronic distance measuring unit, and a thermal imaging camera for recording a thermal image in the direction of the optical line of sight. An angle measuring function is provided for recording the line of sight alignment, and a control unit is provided for controlling the angle measuring function, the thermal imaging camera. In a thermal imaging mode when a measurement procedure is triggered, position data of the sighted target point which are determined in said measurement procedure (Continued)

are linked to temperature information which is read out from the thermal image for the target point at which the line of sight is aimed.

22 Claims, 9 Drawing Sheets

(51) Int. Cl.
  *G01C 7/00* (2006.01)
  *G01C 15/06* (2006.01)

(56) References Cited

U.S. PATENT DOCUMENTS

| | | | | |
|---|---|---|---|---|
| 4,347,739 | A * | 9/1982 | Stegmann | G01N 21/41 33/275 R |
| 4,910,593 | A * | 3/1990 | Weil | G01V 9/005 348/164 |
| 5,386,117 | A * | 1/1995 | Piety | G01N 25/72 250/330 |
| 5,592,151 | A * | 1/1997 | Rolih | G08B 17/12 250/342 |
| 6,504,602 | B1 * | 1/2003 | Hinderling | G01C 1/02 356/141.1 |
| 7,342,650 | B2 | 3/2008 | Kern et al. | |
| 7,633,610 | B2 | 12/2009 | Walser | |
| 8,269,984 | B2 | 9/2012 | Hinderling et al. | |
| 8,400,619 | B1 * | 3/2013 | Bachrach | G01C 1/04 356/4.01 |
| 8,643,716 | B1 * | 2/2014 | Kalokitis | G01M 3/002 340/588 |
| 2006/0049985 | A1 * | 3/2006 | Riel | G01S 3/043 342/432 |
| 2006/0192946 | A1 * | 8/2006 | Walser | G01C 1/04 356/144 |
| 2008/0123903 | A1 * | 5/2008 | Matsuo | G01C 15/00 382/106 |
| 2008/0229592 | A1 * | 9/2008 | Hinderling | G01C 15/002 33/293 |
| 2008/0302966 | A1 * | 12/2008 | Reed | G02B 23/12 250/330 |
| 2009/0015460 | A1 * | 1/2009 | Fox | G01S 7/2922 342/53 |
| 2009/0095837 | A1 * | 4/2009 | Lindgren | F41G 7/263 244/3.13 |
| 2010/0002077 | A1 * | 1/2010 | Viggiano | G01S 13/867 348/115 |
| 2010/0141503 | A1 * | 6/2010 | Baumatz | G01S 7/48 342/27 |
| 2010/0265329 | A1 * | 10/2010 | Doneker | G01S 5/0063 348/144 |
| 2011/0238330 | A1 * | 9/2011 | Fischenberg | G01P 5/001 702/45 |

FOREIGN PATENT DOCUMENTS

| | | |
|---|---|---|
| DE | 10 2008 002 241 A1 | 12/2009 |
| EP | 0 105 867 A2 | 4/1984 |
| EP | 1 314 959 A1 | 5/2003 |
| EP | 2 053 353 A1 | 4/2009 |
| EP | 2 141 450 A1 | 1/2010 |
| JP | 03-185310 A | 8/1991 |
| WO | 2004/036145 A1 | 4/2004 |

* cited by examiner

| LABEL | DESCRIPTION |
|---|---|
| 1 | Measuring device |
| 2 | Detector |
| 3 | Output unit |
| 4 | Sighting device |
| 5a | Rotation axis |
| 5b | Rotation axis |
| 10 | image |

| LABEL | DESCRIPTION |
|---|---|
| 1 | Measuring device |
| 9 | Temperature profile |
| 10 | Thermal image |
| 11a-11e | Temperature ranges |
| 12 | Boundary line/isotherm |
| 15 | object |
| 30 | Measurement beam |

| LABEL | DESCRIPTION |
|---|---|
|  |  |
| 9 | Temperature profile |
| 11a-11e | Temperature ranges |
| 12 | Boundary line or isotherm |
| 13 | Center of the temperature profile |
| 14a | Straight line that runs along a temperature gradient |
| 14b | Straight line that runs along a temperature gradient |

| LABEL | DESCRIPTION |
|---|---|
|  |  |
| 9 | Temperature profile |
| 11a-11g | Temperature or thermal ranges |

| LABEL | DESCRIPTION |
|---|---|
|  |  |
| 9 | Temperature profile |
| 11a-11b | Temperature or thermal ranges |

| LABEL | DESCRIPTION |
|---|---|
| 1 | Measuring device |
| 20a | Image of a building – daylight recording of the building |
| 20b | Image of a building – temperature distribution over the front of the building |
| 21 | Edges of the building |
| 22 | window |
| 23 | chimney |
| 24 | Temperature conspicuousness |
| 30 | Measurement beam |

| LABEL | DESCRIPTION |
|---|---|
|  |  |
| 1 | Measuring device |
| 25 | Construction machine |
| 26 | Target mark |
| 28 | Terrain |
| 30 | Measurement beam |

| LABEL | DESCRIPTION |
|---|---|
| 1 | Measuring device |
| 25a-25b | Construction machines |
| 26a-26b | Target mark on the construction machine |
| 26c-26e | Target mark on the terrain |
| 28 | terrain |
| 30 | Measurement beam |
| 40 | Measuring rod |
| 41 | reflector |

| LABEL | DESCRIPTION |
|---|---|
| 27a | Thermal coding (rectangular area) |
| 27b | Thermal coding (three thermal struts) |
| 29 | Coding element |
| 41 | Reflector |
| 42 | Measuring rod |

GEODESIC MEASURING DEVICE COMPRISING A THERMOGRAPHIC CAMERA

FIELD OF THE INVENTION

The invention relates to a geodesic measuring device for measuring distances and angles with respect to points on an object and a method for measuring distances and angles with respect to points on an object.

BACKGROUND

Generally known examples of geodesic measuring devices are the theodolite or the total station. Geodesic measuring devices are used for determining distances and for simultaneously acquiring corresponding angles with respect to target points. Such systems are in widespread use primarily in the field of landscape surveying or for positioning tasks in industry. Both areas of use demand the exact determination of the variables of distance and angle over in some instances large distances, in order e.g. to be able to precisely plan and implement subsequent building development of a surveyed terrain or in order to control a machine incorporated into a production process.

One known extension of these measuring devices is combination with an image recording unit, usually integrated into the device. Thus, in addition to the variables determined, e.g. a camera can be used to acquire images of an environment in which the target points are situated. This combination opens up the possibility, inter alia, of carrying out a measurement e.g. by means of image-assisted target point seeking. Moreover, the recording of an optical image makes it possible to bring about a target identification or target tracking and thus a further facilitation and automation of the measuring process. An automatic target tracking is known from EP 2 141 450, for example, wherein a sighting direction of a measuring station is automatically aligned with a target on the basis of a processed image.

Furthermore, an image of a recorded environment to be measured can be displayed on a display fitted to the measuring device. By means of an input unit, a user is thus enabled to select specific points of interest on the image and to determine the exact positions of the points with the aid of the distance and angle measuring devices incorporated in the measuring device.

EP 1 314 959 and WO 2004/036145 disclose for example geodesic measuring devices comprising an electronic display and control device which enable screen-based operation.

In a two-dimensional representation of an optical image, it is accordingly possible to define points with respect to which a measurement, i.e. the determination of distance and/or angle, is effected. On the basis of an image that can be acquired by various recording means, targets can be identified and tracked by means of image processing methods, such that an automatic measurement is possible in principle on this basis thus provided. In addition, with such an embodiment—by means of the arrangement of at least one camera with an extended acquisition spectrum—ranges and object properties which are outside the visual accessibility of the human eye can be made accessible to the measurement.

By means of these geodesic measuring devices, points selected beforehand, e.g. on a display, can be sighted, moved to and subsequently measured. For the user of such a device, this significantly simplifies the operability and affords the major advantage with regard to ergonomics that the device need not necessarily be aligned through an eyepiece, but rather can be controlled on the basis of the display or via a remote control.

What is disadvantageous, however, is that only angle and distance data can be ascertained with respect to an appropriate point and, furthermore, no further information about e.g. the object on which the point is situated can be acquired. Furthermore, no assignment or linking of position information to further image-based object- or target-point-related data takes place.

Additional information about an object or the surface thereof can be acquired e.g. on the basis of a camera-recorded color value or else by means of a thermal imaging camera. By means of this information, it is possible to derive specific object properties or properties of at least parts of objects. By way of example, thermal imaging cameras can be used for identifying irregularities in a heat distribution or heat leaks and it is thereby possible to ascertain such locations e.g. at buildings. A thermal detector can also be used in fire fighting—for finding a fire source—or for target identification when darkness prevails.

One problem in the course of using a thermal imaging camera that can be handheld arises when an exact position of a conspicuous feature identified by the camera or e.g. the dimensioning of said conspicuous feature is intended to be determined. Such a positioning or determination of the extent cannot be performed solely from a manually acquired thermal image, which can then usually be displayed on a display at the camera. However, exact position determination for such conspicuous features would be desirable inter alia in the case of e.g. construction measures to be performed for the purpose of improving insulation or repair work.

SUMMARY

Accordingly, a problem addressed by the present invention is that of providing a device and a method whereby thermal energy properties, in particular temperature properties, of objects can be locally correlated with position information of points on said objects.

One specific problem addressed by the invention is that of providing a device and a method whereby information can be derived from thermal energy properties and said information can be locally correlated with position information of points.

A further specific problem addressed by the invention is that of providing a system whereby objects can be identified rapidly and reliably on the basis of their thermal energy properties, in particular temperature properties. Furthermore, position information is intended to be able to be assigned to the identified objects.

These problems are solved by the realization of the characterizing features of the independent claims. Features which develop the invention in an alternative or advantageous manner can be gathered from the dependent patent claims.

A method according to the invention for determining, with geodesic precision, the position of a target point on a target object is carried out using a geodesic measuring device comprising a sighting device, in particular a telescopic sight, wherein the sighting device is pivotable relative to a base of the measuring device in order to change the alignment thereof and at least has an objective unit that defines an optical aiming axis, an electronic distance measuring unit, and a thermal imaging camera for acquiring a thermal image, in the direction of the optical aiming axis.

Geodesically precise position determination (geodesic precision) for a target should be understood to mean, depending on the respective measurement requirement, determining the position of the target present at a distance of up to hundreds of meters (or a few kilometers) with a precision (resolution) in the centimeter or millimeter range, in particular in the submillimeter range, in conjunction with high reliability of this position measurement (low measurement uncertainty). The geodesic measuring device furthermore has an angle measuring functionality for acquiring, with high precision, the alignment of the aiming axis, and a control unit for controlling the angle measuring functionality and the thermal imaging camera, and in particular the alignment of the sighting unit. According to the invention, in a thermal image measurement mode as a result of the initiation of a measurement process, position data of the sighted target point which are determined in this case, together with temperature information read out from the thermal image for the target point sighted using the aiming axis, are linked to one another in pairs in such a way that they can be called up in a manner associated with one another, in particular wherein the position data of the target point are stored in a manner correlated with the temperature information. In this case, the respective determined position data of the sighted target point are linked to the respective temperature information for the target point.

According to a method according to the invention, a target point on the target object acquired in the thermal image can be measured in a georeferencing manner, in particular automatically, on the basis of a temperature measurement criterion predefined depending on the temperature information which can be read out from the thermal image, wherein the optical aiming axis of the measuring device is aligned with the target point. In order to define the temperature measurement criterion, the temperature information in the thermal image can be converted, in particular by means of image processing, into areas each representing a temperature range, wherein the areas are delimited with respect to one another by isotherms, and/or a center of a temperature range, in particular an area centroid, can be determined. By means of the temperature measurement criterion, it is possible to determine temperature information for a measurement process in such a way that those positions which correspond to the temperature information determined can be measured automatically on the basis of the temperature measurement criterion thus defined. In this context, the measurement laser beam can be automatically aligned with the respective positions and the corresponding points can thus be measured.

By means of such image processing, a recorded temperature profile which varies in color continuously in accordance with a temperature gradient or slope can be subdivided into individual zones, wherein each of these zones represents a previously determined temperature range, e.g. from +10° C. to +15° C. The temperature ranges can be adapted in accordance with the temperature difference from the largest measured temperature to the smallest measured temperature. In the case of large temperature differences, for example, larger ranges can be defined in order that the number of ranges determined on the basis of an image can be kept manageable; conversely, in the case of an overall small temperature difference, the temperature range for a zone can likewise be chosen to be small, in order that differentiations of ranges can thus be effected.

On the basis of the zones thus derived, a boundary line between two zones can in turn be determined by means of image processing. Said boundary line then simultaneously embodies a line which, along its course, can represent a constant temperature on an object. Along these derived isotherms, a measurement can take place and the limit of a temperature range can thus be determined exactly. In addition to determining delimiting isotherms, it is also possible to derive centers of the zones, which correspond e.g. to the area centroid and thus simultaneously represent the central point of said zone. The determination of a position of a source of a heat leak can be carried out by means of this calculation. Thus, by way of example, it is possible to localize leakages on heat-carrying lines and subsequently to implement measures for sealing or to locate further heat sources.

In particular, with a method according to the invention, measurement can be effected along a path representing predetermined temperature information or a temperature profile, in particular along the isotherms, and/or constantly with respect to a point of the predetermined temperature information, in particular with respect to the center of the temperature range.

As a result, it is possible to determine not just individual points appropriately and positionally, rather it is possible to carry out a precise determination and measurement of extensive objects whose properties correspond to a predetermined (temperature) criterion. Thus, by way of example, it is possible to measure a region or point in which a temperature conspicuousness is present and this region can be processed on the basis of the position information determined in this case. Alternatively or additionally, it is possible to track not only a spatial profile of a temperature criterion, but also a temporal profile. In other words, it is possible e.g. constantly to carry out measurements with respect to predefined points and firstly to track a possible change in the spatial position of said points and/or secondly to record a change in temperature and the temporal profile of this change at said points. Consequently, at least these two cases of observation can be relevant. Thus, firstly it is possible to acquire and observe the temperature and/or its change or its temporal profile on a spatially defined point; secondly, it is possible to predefine a defined temperature and to constantly determine the position of a point or region having said temperature. By means of this possibility, it is possible to observe objects over a long period of time and to detect changes in their structure and/or in their thermal properties. A temporally extensive observation duration can be used in particular for monitoring large structures, such as e.g. a dam, and contribute to fulfilling safety conditions.

In addition, with a method according to the invention, measurement can be effected automatically with a predetermined point-to-point resolution and/or with a predetermined temporal separation of individual measurements. It is thereby possible to vary the desired or required precision of dimensions and positions to be acquired and a measurement duration associated therewith. Thus, both the center of a temperature zone and the delimitation thereof by an isotherm can be measured with appropriate precision and, on the basis of these measurement data, e.g. constructional work or repair measures can be carried out positionally precisely on an object. By way of example, for this purpose it is possible to detect between 5 and 50 points over a distance of 10 cm along a line. Alternatively, a resolution can also be defined in a manner dependent on an angle change; thus, it is possible to measure e.g. 10-100 points during a change in the detection angle of 10°. With regard to the temporal detection, by way of example 1-60 measurements can be effected per minute.

In the context of a method according to the invention, furthermore a reference beam can be guided along a reference path, wherein, during the guidance of the reference beam, at least one part of the reference path is perceptible on the object as a reference line visually and/or by means of a detector and the reference beam is guided on the basis of the temperature measurement criterion, in particular along the isotherms.

Such a method, carried out e.g. by means of a total station, can afford further advantages for the user and whoever plans furthermore to carry out activities on the basis of the position information generated. Thus, positions determined beforehand on the basis of an acquired image of an object can be marked. For the marking of the position, a laser beam visible to the human eye can be projected onto one of the measured points and thus indicate e.g. a heat source. By guiding the visible beam along a derived isotherm, it is furthermore possible to identify an extensive area region, when this identification can be maintained in particular for the duration of a possible technical activity or for marking out the region determined. With the use of a laser beam that is not visually perceptible, a detector can be used to find the marking laser beam and to determine the course thereof.

In a method according to the invention, the temperature information and a corresponding daylight image can be represented independently of one another and/or at least partly in a superimposed manner, in particular wherein the temperature information and/or position information with respect to points can be transmitted to a controller. Furthermore, the distances and angles with respect to points can be referenced and linked to a local coordinate system.

A superimposition or a juxtaposed representation of the thermal image and of a daylight image corresponding thereto can contribute to an unambiguous identification of points to be measured within the visual range of the two images. By way of example, if an unambiguous differentiation of points cannot be reliably carried out solely on the basis of the thermal image, then a daylight image that captures the same visual range as the thermal image can be consulted for differentiation and the differentiation can thereby be made possible. By superimposing the two images it is possible—depending on the respective measurement environment—, in contrast to a representation of the images next to one another, for the unambiguity with regard to a differentiation of points to be increased further. Thermal and daylight images can be captured by means of one camera or one sensor, which can realize recordings in both spectral ranges, or by means of two different sensors. The controller generally allows the user to operate a total station by remote control. By means of the transmission of the image information acquired by the camera, in particular in real time, the user can use the specific temperature information for aligning the total station by remote control and for measuring points.

Furthermore, with a method according to the invention, the coordinates with respect to a target point on the target object can be determined and extracted and the coordinates are transmitted into a computer unit, in particular into a CAD system, wherein measurements of distances and angles in the acquired thermal image can be carried out on the basis of the coordinates. In this case, the coordinates can represent positions by indications of degrees of longitude and latitude, wherein additional altitude information with respect to the positions can be present. The position data generated in the measurement process can be linked to the thermal and/or daylight image information and both be processed further directly on the measuring device and be transmitted to a further computer system. The linkage created makes it possible to carry out a determination of e.g. distances, surface areas, temperatures on objects or temperature profiles, without having to carry out further measurement processes. Furthermore, with respect to each acquired image of the measuring device, at the same time an acquisition direction can be concomitantly acquired and in particular linked to and stored with the acquired image. Using this direction information, a point on a previously acquired image can be selected and declared as "to be measured" such that the measuring device can automatically move in the concomitantly acquired acquisition direction and measure the selected point.

A geodesic measuring device according to the invention, in particular a total station or a theodolite, for determining position data of a target point on a target object comprises a sighting device, in particular a telescopic sight, wherein the sighting device is pivotable relative to a base of the measuring device in order to change the alignment thereof and at least has an objective unit that defines an optical aiming axis, an electronic distance measuring unit, and a thermal imaging camera for acquiring a thermal image, in the direction of the optical aiming axis. Furthermore, an angle measuring functionality for acquiring, with high precision, the alignment of the aiming axis, and a control unit for controlling the angle measuring functionality and the thermal imaging camera, and in particular the alignment of the sighting unit, are provided. According to the invention, in the context of a thermal image measurement mode under the control of the control unit, as a result of the initiation of a measurement process, the position data of the sighted target point, together with temperature information whose position on the thermal image corresponds to a position of the target point that is defined by the alignment of the optical aiming axis, are linked to one another in pairs in such a way that they can be called up in a manner associated with one another, in particular wherein the position data are stored in a manner correlated with the temperature information by storage means.

Furthermore, a geodesic measuring device according to the invention, in particular comprising means for image processing, can be embodied in such a way that the measuring device has a control functionality, wherein, in the context of the control functionality, an abovementioned method according to the invention for determining, with geodesic precision, the position of a target point on a target object is performed, in particular automatically. The measuring device can furthermore have means for image processing and/or a source of electromagnetic radiation, in particular a laser beam source, for generating a reference beam and guide means for guiding the reference beam along a reference path, and the control functionality can be designed in such a way that, when the control functionality is performed, one of the abovementioned methods according to the invention is performed.

With a geodesic measuring device according to the invention, as a result of the initiation of the measurement process, a georeferencing measurement—controlled by the control unit—with respect to a target point on the target object acquired in the thermal image can be effected, in particular automatically, on the basis of a predefined temperature measurement criterion, wherein the optical aiming axis of the measuring device is aligned with the target point. In this case, the measurement can be effected on the basis of a thermal image conditioned by means of image processing. In order to define the temperature measurement criterion, it is possible to carry out a conversion of the temperature information into areas each representing a temperature range, wherein the areas are delimited with respect to one another by isotherms, and/or a determination of a center of a temperature range, in particular of an area centroid, by image processing means.

According to the invention, the measurement can be effected along a path representing predetermined temperature information or a defined temperature profile, in particular along an isotherm, and/or constantly with respect to a point of the predetermined temperature information, in particular with respect to a center of a temperature range.

On a geodesic measuring device according to the invention, the control unit can furthermore be designed in such a way that the measurement is effected automatically with a predetermined point-to-point resolution and/or with a predetermined temporal separation of individual measurements.

Furthermore, the inventive geodesic measuring device can have a source of electromagnetic radiation, in particular a laser beam source, for generating a reference beam and guide means for guiding the reference beam along a reference path, wherein during the guidance of the reference beam, at least one part of the reference path is perceptible on the object as a reference line visually and/or by means of a detector and the reference beam is guided on the basis of the temperature measurement criterion, in particular along an isotherm. Moreover, a temperature-specific point, in particular the center of the temperature range, can be marked by means of the reference beam.

The inventive geodesic measuring device can have an output unit, in particular a display, wherein the temperature information and a corresponding daylight image can be represented independently of one another and/or in a manner at least partly superimposed on the output unit. In particular, with a geodesic measuring device according to the invention, acquired data and/or information can be communicated to a controller, wherein output means for representing the acquired data and/or the information, in particular the temperature information, are provided at the controller.

Furthermore, with a geodesic measuring device according to the invention, coordinates with respect to the target point on the target object can be determined and extracted and the coordinates can be transmitted into a computer unit, in particular into a CAD system, wherein measurements of distances and angles in the acquired thermal image can be carried out on the basis of the coordinates.

On a measuring device according to the invention, such as e.g. a theodolite or a total station, a camera is arranged, which can be used to acquire images of an environment, wherein the acquired images are in each case related to a measuring direction of the total station. As a result, it is possible to select a point to be measured on an image and then to measure its exact position using distance and angle measuring means. For selecting the point, an acquired image can be conditioned by means of image processing. On a corresponding measuring device, alignment means, e.g. servo or stepper motors, can furthermore be provided, with which the alignment of the measuring direction can be set and by means of the control of which a measurement based on an acquired image can be performed automatically. Instead of a camera whose spectral range corresponds to that of the human eye, alternatively or else additionally it is possible to provide a thermographic camera or a thermal imaging camera which has a spectral detection range which is wider or shifted in the spectrum and thus makes optical ranges that are inaccessible to the human eye accessible in a mediated manner and can acquire e.g. temperature information in the infrared range (and thus indirectly energetic properties of objects). Such a camera can be embodied such that it can capture both a daylight image and a thermographic image and can make available the image information in each case—represented by electronic signals—either individually or in a combined or superimposed manner.

With such a measuring device, therefore, firstly an object can be captured by the camera such that an image which arises as a result corresponds to the visually perceptible range of the human eye. In addition to this image, a further image can be created by a recording in the infrared range. Both images can be displayed to a user individually, together next to one another or at least partly in a superimposed manner on a display provided on the measuring device or on the total station. In addition, data or forms extracted from a thermal image can also be superimposed with the daylight image. Alternatively or additionally, one or both images can also be represented on a remote control or a controller with display, which is connected to the measuring device, in particular in a wireless manner via radio. This display can furthermore be embodied as a touch-sensitive "touch display" and thus simultaneously serve as input means for the user alongside other input means possibly present, such as e.g. a keyboard.

On the basis of a displayed image, the user can select a point in an environment captured on the image and can determine the position data with respect to said point by measurement. On the basis of a thermographic image, more extensive possibilities during object measurement can be made available to the user. Temperature information, usually represented by a color gradation, can be graphically visualized on such a thermal image. A temperature profile can usually be represented thereon in such a way that a wavelength which is detected in the spectral range and which corresponds e.g. to a comparatively low temperature of an object is represented in a blue-violet color and regions on objects having a high temperature are correspondingly represented as reddish. Between these limits of the detectable spectral range, object temperatures are represented in accordance with a previously defined color profile.

By way of example, a temperature distribution of an object, e.g. of a house, can thus be represented with a color gradation in order to provide information about which parts of the object are heated to a greater extent and possibly emit more heat to the environment than other colder parts. Such information enables the user for example to identify a heat leak or to investigate the quality of an insulation. After a leak has been visually located, the position of the leak can then subsequently be moved to and measured exactly by means of the angle and distance measuring unit of the total station. From energetic standpoints, in particular, this combination of visual detection process and geodesic measurement process for temperature zones affords a very good possibility for identifying and determining the position of instances of temperature conspicuousness and implementing measures on the basis thereof. By way of example, it is thus possible to determine locations or positions at which an insulation of a building does not comply with generally required standards. The deficient insulation can then be repaired effectively and with pinpoint precision.

Furthermore, the spectral detection range of a thermal imaging camera can differ e.g. from the detection range of the human eye with regard to the reflection property of radiation on objects. As a result, by means of a thermal imaging camera, different object properties can be acquired by detecting reflections, in particular reflections of electromagnetic radiation having a wavelength which is in the detection range of the camera, wherein the temperature of the object can be constant as much as possible over the extent thereof. On the basis of such reflection properties, a measurement with respect to a target point thus identified can in turn be effected.

A measuring device according to the invention can furthermore also be used effectively in an environment that appears dark to the human eye. The thermal radiation emerging from objects can be detected even in darkness, wherein points can be selected and measured on the basis of the images thus recorded. Such a use proves to be advantageous particularly under difficult lighting conditions e.g. underground or when constructing road or railroad tunnels. Intensive artificial illumination of the measurement environment can thus be dispensed with in part. Particularly when a natural terrain does not have to serve as target object, but rather target marks are used which possibly have a thermal signature, a total station according to the invention comprising an infrared or thermographic camera can be used in an environment that is absolutely devoid of light.

In particular, the detector of a geodesic measuring device according to the invention can detect a thermally coded target mark, wherein a detection direction of the measuring device can be constantly aligned with the target mark by means of alignment means for aligning the measuring device. By means of a total station corresponding to the invention, it is thus possible to carry out sighting and tracking of one or a plurality of thermally coded, e.g. heated in a defined manner, targets. By means of different codings, in particular by means of different temperatures of the targets, a plurality of target marks can be identified and differentiated from one another. Such target marks can furthermore be assigned to previously determined machines or objects and it is then possible to determine these objects with tracking of the respective targets e.g. in a manner controlled with positional precision or the positions thereof, in particular also constantly. In this case, the measuring device can be aligned with the target mark constantly, e.g. by means of actuating, stepper or servo motors, in particular continuously, such that the detection direction of the device points directly in the direction of the target mark.

A system according to the invention comprises a measuring device according to the invention and a target mark, wherein the target mark has a predetermined thermal coding, in particular a region of defined temperature and/or a defined geometric arrangement of temperature-regulated regions, wherein a position of the target mark on the thermal image acquired by the thermal imaging camera is determinable by means of an identification of the thermal coding, in particular by image processing. By means of such a target identification functionality, a target mark or target assigned to a machine, for example, can be determined positionally precisely and the position of the machine can thus be derived. For this purpose, at least part of the target mark can be heated to a defined temperature.

In addition, by means of the system according to the invention, in the context of target tracking, the position of the target mark on the thermal image can be assigned to the direction of the optical aiming axis of the measuring device and the control unit can be designed for controlling the alignment of the sighting unit in such a way that the optical aiming axis is constantly aligned with the target mark. With this alignment, a target provided with a target mark can be tracked. By way of example, the position of a construction machine in the terrain can be continuously ascertained.

Furthermore, the target mark for use with the system according to the invention can have a temperature-regulating unit for the thermal coding of at least one part of the target mark.

A further aspect of the invention is a method for determining the position of a target point with a target mark using a geodesic measuring device with a thermal imaging camera, wherein the target mark is thermally coded in a defined manner and the position of the target mark on the acquired thermal image is determined.

In this case, the position of the target mark on the thermal image can be assigned to the direction of the optical aiming axis of the measuring device and the aiming axis can be constantly aligned with the target mark. In addition, the target mark can have an at least partial thermal coding.

BRIEF DESCRIPTION OF THE DRAWINGS

The method according to the invention and the device according to the invention are described in greater detail purely by way of example below on the basis of concrete exemplary embodiments illustrated schematically in the drawings, and further advantages of the invention will also be discussed. Specifically in the figures.

DETAILED DESCRIPTION

Figure 1:
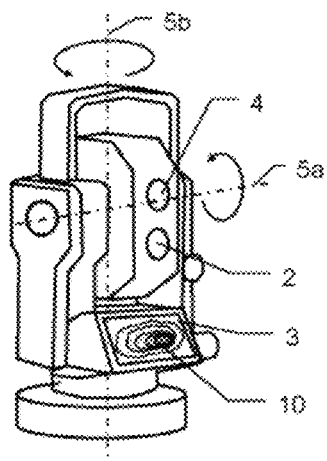
FIG. 1 shows a measuring device according to the invention with a thermal imaging camera.

FIG. 1 shows a measuring device 1 according to the invention with an integrated detector 2, which can be embodied in particular as a thermal imaging camera, wherein the detector 2 has a detection direction as much as possible parallel to a sighting direction of a sighting device 4, likewise arranged in the measuring device. Furthermore, the measuring device is provided with an output unit 3, in particular with a display, on which images 10 acquired by the camera 2 can be represented. Moreover, the device has two mutually perpendicular rotation axes 5a, 5b for alignment with an object. The measuring device, e.g. a total station, can thus be aligned with an object by means of the rotation of the sighting device 4 about the two axes 5a, 5b and can firstly acquire an image 10 of said object, in particular with temperature information. From the image, a temperature profile of the object can subsequently be derived and temperature zones defined by means of image processing can be determined. Afterward, points of interest, e.g. points with instances of temperature conspicuousness, can be measured with the aid of the sighting device 4 and their position on the object can be determined exactly.

Figure 2:
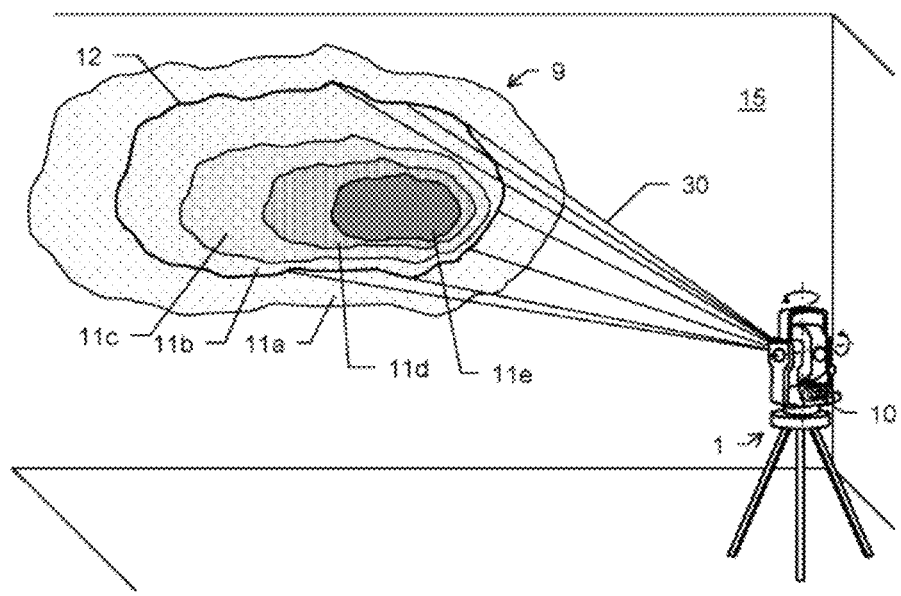
FIG. 2 shows a thermal image recorded on an object surface with a measuring device according to the invention.

FIG. 2 shows a measuring device 1 according to the invention and an object 15, or the object surface thereof, a thermal image 10 of which is acquired. On the object 15 itself, a temperature profile 9 corresponding to the thermal image 10 is shown for the purpose of better illustration. In a spectral range accessible to the human eye, the object surface would appear as a homogenous area without conspicuous features. However, by extending the spectral range that can be perceived and displayed, it is possible for further properties of said surface to be visualized. The temperature profile corresponds to a representation after image processing performed on a continuous temperature profile. The formerly continuous (color) profile is subdivided, by image processing means at the measuring device, into the zones or ranges 11a-e, each representing a predefined temperature range. The temperature ranges 11a-e are in turn delimited from one another by in each case a boundary line 12 representing a specific temperature. By way of example, such an isotherm 12 is illustrated between the ranges 11a and 11b. A temperature range embodied by the temperature zone 11b can extend for example from 35° C. to 30° C., wherein a temperature of 30° C. is then present along the isotherm 12 and the temperature zone 11a represents the temperature range of e.g. 30° C. to 25° C. Outside the zone 11a, a temperature of less than 25° C. can then prevail and is not detected any further in accordance with the detection settings of the thermal imaging camera 2. By means of the sighting device 4 arranged in the measuring device 1, furthermore, the position and the delimitation of a temperature range of interest on the object 15 can be measured exactly and, in a next step, be extracted into a CAD model and be transferred together with the object 15 into a coordinate system. For this purpose, a measurement beam 30 is guided e.g. along the isotherm 12 determined in the image 10 and the distance with respect to the object 15 is determined constantly with a predetermined point-to-point resolution. In this case, the measurement beam 30 can be guided automatically, in particular.

Figure 3:
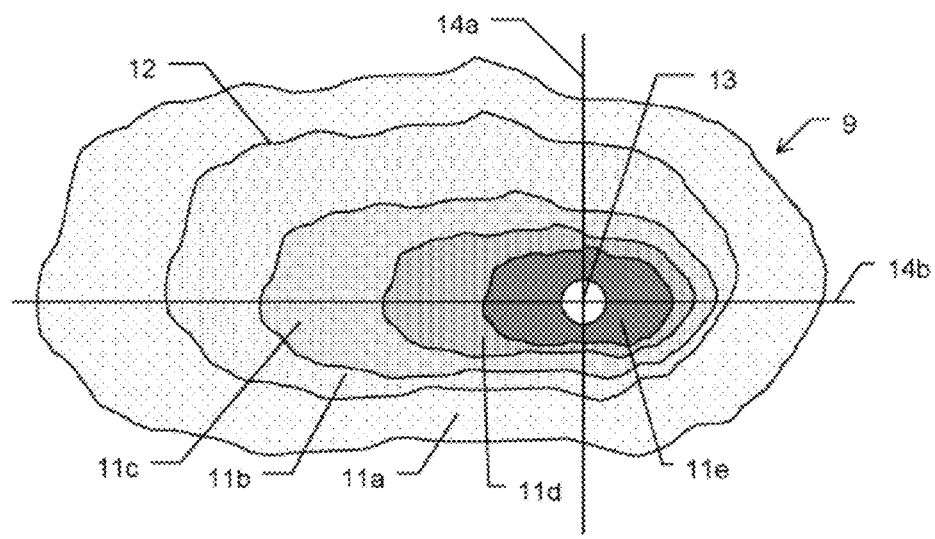
FIG. 3 shows a temperature profile with a localized heat source.

FIG. 3 shows the temperature profile 9 from FIG. 2, wherein the classification of the temperature profile into temperature ranges 11a-e has likewise already been effected by means of image processing. The temperatures of the temperature zones 11a-e increase toward the center, that is to say that the zone 11a has a temperature range having lower temperatures than the zone 11e, representing the range having the highest temperatures. By means of image processing, furthermore, the center 13 of the temperature profile can be determined and e.g. a heat or cold source can thus be localized. Likewise, it is possible to define straight lines 14a, 14b which run along a temperature gradient and run through the center 13 of the temperature profile. As a result, it is possible e.g. to perform a measurement along the straight lines 14a, 14b and to localize thereon points having the lowest and simultaneously points having the highest detected temperatures. It is thus possible to make statements about the temperature profile or the extent of one of the plurality of temperature ranges 11a-e, wherein it is not necessary to measure the entire spatially detected temperature range 11a-e, rather it suffices to measure e.g. two mutually perpendicular straight lines 14a, 14b which intersect at the center 13.

Figure 4A:
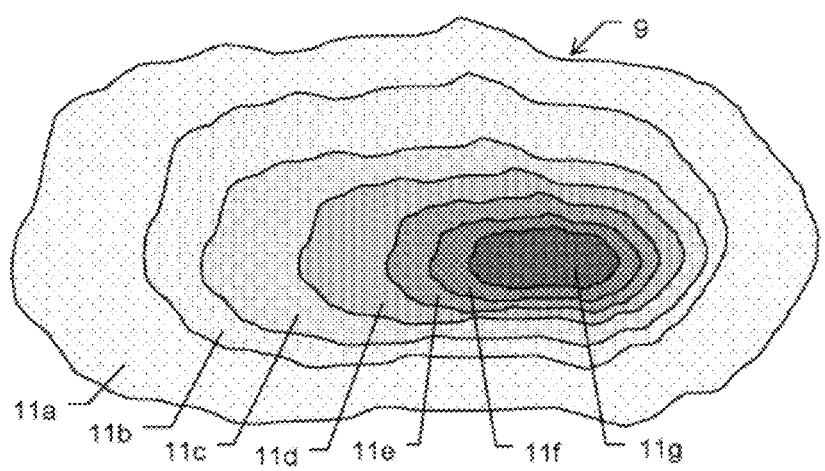
FIGS. 4a-b show subdivisions of a temperature profile of a thermal image into different heat zones.
Figure 4B:
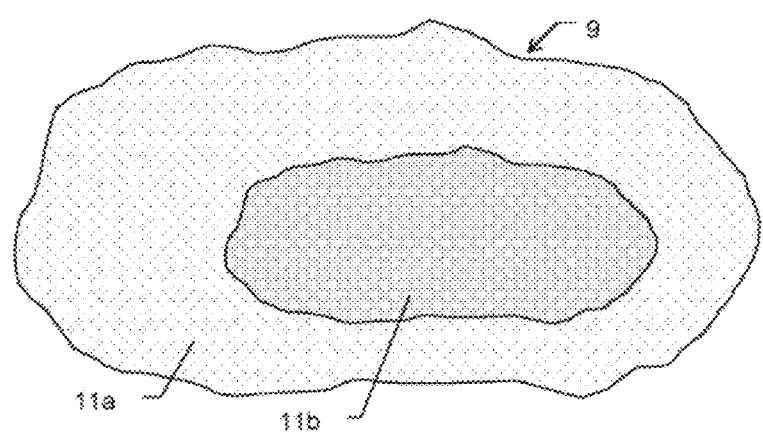

FIGS. 4a and 4b each show an exemplary subdivision of a temperature profile 9 into temperature or thermal ranges 11a-g. In this case, the entire detected temperature range in FIG. 4a is subdivided into seven sub-ranges 11a-g, wherein the temperature range in FIG. 4b is subdivided only into two sub-ranges 11a-b. Such a different subdivision of a temperature range can make the desired information clear, depending on the requirement. If e.g. a temperature profile 9 is detected which encompasses a relatively small temperature difference of e.g. in total 0.5° C., then a subdivision of this total profile into a plurality of sub-ranges can make it possible to carry out a differentiation and a classification of temperature ranges. By contrast, particularly when evaluating a temperature profile which encompasses a relatively large temperature range of e.g. 100° C. temperature difference, said profile can be represented in a manner gradated in fewer ranges in order here, too, to be able to perform a meaningful differentiation of temperature zones.

Figure 5:
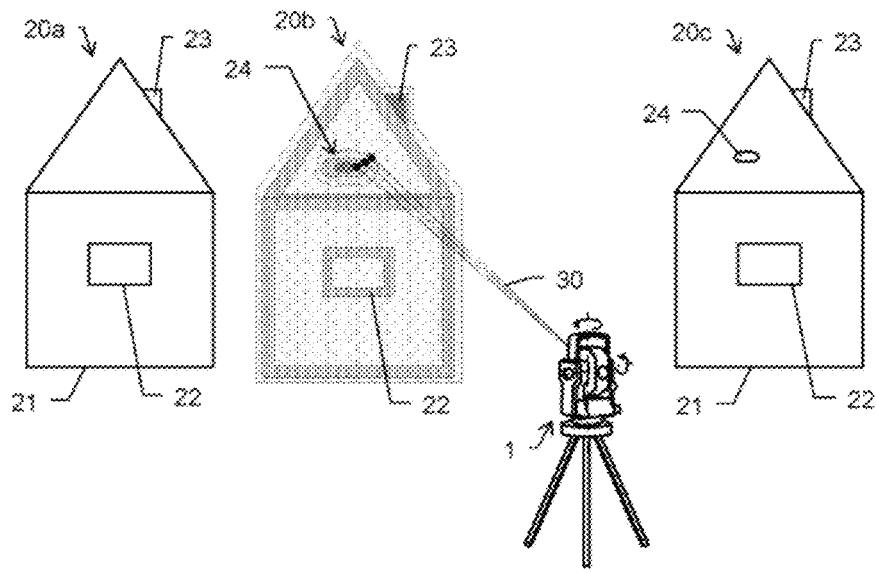
FIG. 5 shows a daylight and a thermal image recording of a building with a measuring device according to the invention.

FIG. 5 shows three images 20a-c of a building and a measuring device 1 according to the invention, which can be used to acquire said images. The first image 20a shows a daylight recording of the building, wherein this recording can be acquired both by means of a camera assigned to the measuring device 1 and having a spectral detection range corresponding to the human eye, and by means of a spectrally extended thermal sensor at the measuring device, in particular by means of a thermal imaging camera. The edges 21 of the building, a window 22 and a chimney 23 are visible on the image 20a. In the second image 20b, by contrast, sharp edges 21 of the building are no longer visible, rather the temperature distribution over the front of the building is represented. This image 20b may have been acquired by a thermal imaging camera in the infrared spectral range. The regions of the building which are represented darker are clearly discernible, which substantially run along the edges 21 of the building, around the window 22 and in the region of the chimney 23 and indicate regions in which a greater thermal emission is present. In addition, a temperature conspicuousness 24 can be visualized in the thermal image recording 20b. Said temperature conspicuousness 24 can indicate that at this location e.g. a heat leak, caused for example by a defective building insulation, is present at the building. The heat leak 24 can be measured on the basis of the image information by means of the measuring device 1 and the position with respect to the building can be determined exactly. For this purpose, a measurement beam 30 can be guided along previously derived isotherms and can measure the latter with a defined resolution. By extracting isotherms, it is possible to determine a core region of the temperature conspicuousness 24 and to transfer it into a common coordinate system together with the building coordinates. The precise position of the leak 24 relative to the building can thus be represented with the aid of a CAD model. Furthermore, a further image 20c can be generated, which shows the building contours visible from the daylight image 20a together with the heat leak 24. By superimposing the information derived from the two images 20a and 20b, the position of the temperature conspicuousness 24 can be represented exactly and visually marked by means of a, more particularly visible, laser beam by the beam being guided along a reference path corresponding to the delimitation of the core region of the heat leak 24. Such a marking can serve for orientation e.g. for repair work for eliminating the heat leak 24.

Figure 6:
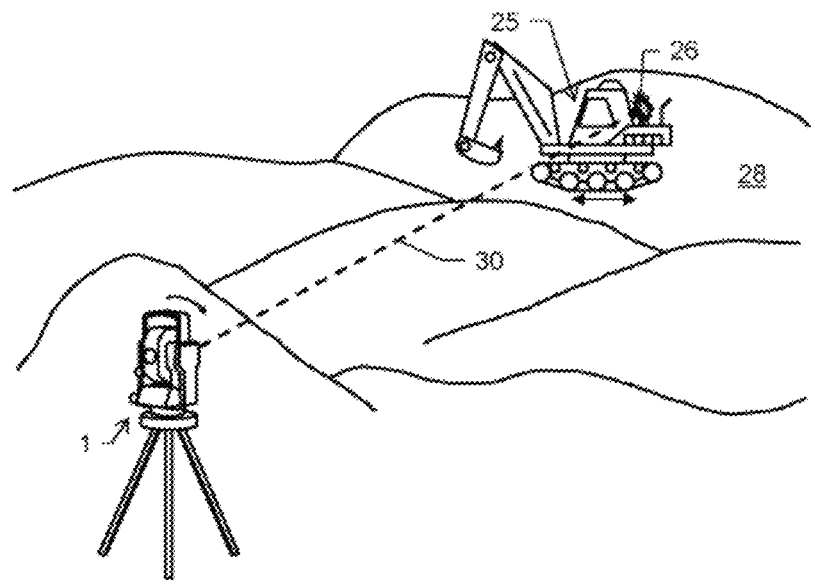
FIG. 6 shows a construction machine with a thermally coded target mark and a measuring device according to the invention.

FIG. 6 shows a measuring device 1 according to the invention and a construction machine 25 in the terrain 28. The construction machine 25 has a target mark 26, which can be sighted by the measuring device 1 by means of a measurement beam 30. According to the invention, the target mark 26 can furthermore be thermally coded, that is to say that the target mark 26 can be heated at least partly to a predefined temperature, for example to a defined value of between 50° and 100° C., or be cooled for example to a defined value of between 5° C. and 20° C., such that a thermal radiation defined thereby emerges from the target mark 26. In particular, the temperature can be chosen in such a way that a clear differentiation of temperature-regulated objects from the environment is possible. Thus, depending on the outside temperature or ambient temperature, a temperature or temperature range suitable for the respective requirements can be chosen or predefined for the target mark 26. By way of example, given a prevailing air temperature of 40° C. and sunshine, a temperature range of 100° C. to 110° C. may be suitable for the target mark 26, and a target mark 26 temperature-regulated to 30° C. may be suitable at −20° C. The measuring device 1 once again has a thermal imaging camera which can be used to capture the construction machine 25 and thus simultaneously the target mark 26 that is temperature-regulated in a known and defined manner. By means of image processing, in the measuring device 1, the temperature of the target mark 26 can be determined and the position thereof with respect to the detection direction of the camera or with respect to the sighting direction of the sighting unit can be derived. By means of the predefined temperature of the target mark 26, the target mark 26 captured in the thermal image can be identified at the measuring device 1 according to the invention and, with the assignment of the target mark 26 to a construction machine 25, the position of the construction machine 25 can be determined unambiguously.

For an initializing identification of a target mark 26, an initialization can be effected by the target mark 26 that is temperature-regulated in a defined manner being recorded by means of the thermal imaging camera and, from the recorded image, a temperature or a temperature range for the target mark 26 can be derived and stored. In this case, the temperature regulation of the target mark 26 or of parts thereof can be produced and maintained by means of a radiant heater assigned to the target mark. As an alternative thereto, the target mark 26 can be heated to a specific predefined temperature and a temperature conspicuousness corresponding to that predefined temperature can be sought by means of image processing on an acquired thermal image on the part of the measuring device 1.

Figure 7:
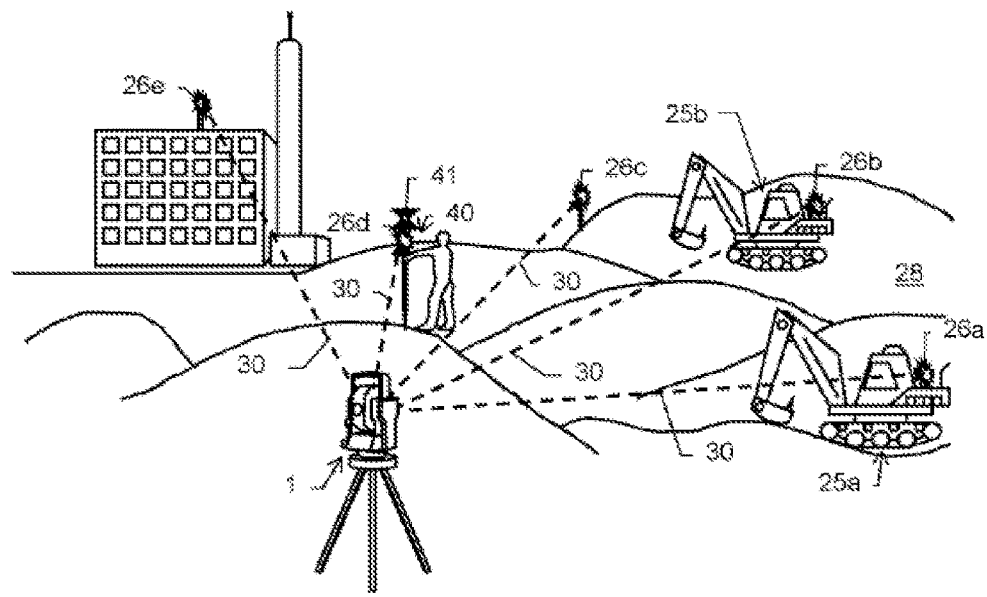
FIG. 7 shows a terrain with thermally coded target marks and a measuring device according to the invention.

FIG. 7 shows how a plurality of differently temperature-regulated target marks 26a-e can be simultaneously assigned to a plurality of objects. In this case, the marks 26a and 26b are respectively assigned to a construction machine 25a and 25b. By means of a constant image analysis of a thermal image acquired at the measuring station 1 according to the invention and subsequent image processing, the movements of the target marks 26a and 26b and thus the movement of the construction machines 25a and 25b can be concomitantly tracked in the acquired image and, on the basis thereof, a compensating alignment of the measuring station 1 in the direction of the target marks 26a and 26b can be effected. By means of the different thermal coding of the marks 26a and 26b, the latter can be rapidly differentiated from one another and the sighting direction of the measuring device 1 can thus be aligned rapidly and precisely with the respective target mark 26a, 26b and a precise determination of the position of the construction machine 25a, 25b can be carried out. In addition to the target marks 26a and 26b on the construction machines 25a and 25b, further target marks 26c-e are positioned in the terrain 28. In this case, the two marks 26c and 26e are arranged at a respective measurement point in the terrain 28 and on the building shown. By virtue of the fact that these two target marks 26c and 26e in turn appear different on an acquired thermal image, the corresponding targets can be rapidly differentiated from the others, the measuring station can be aligned with them and their position can be determined exactly. A further target mark 26d shown is arranged on a measuring rod 41 guided by a user. The target mark 26d that is temperature-regulated in a defined manner can in turn be identified on the part of the measuring station 1 unambiguously by means of the processing of an acquired thermal image, on which the target mark 26d is concomitantly captured, and of the temperature characteristic recorded therein. On the basis of a direction with respect to the target derived therefrom and with knowledge of the distance roughly at which the target is situated and the spatial relationship between the temperature-regulated target mark 26d and a reflector 41 on the measuring rod 40, that is to say the distance between the target mark 26d and the reflector 41, the reflector 41 can be sighted directly by the sighting unit of the measuring station 1 and the precise position of the measuring rod can thus be determined. In addition, the position of the measuring rod 40 can be constantly determined on the basis of the temperature-regulated target mark 26d by means of image acquisition and image evaluation and the targeting device of the measuring station 1 can be aligned with the reflector 41, e.g. a prism. The user of this measuring system according to the invention is thus enabled to pace out different measurement points and to detect the respective positions of the points rapidly and automatically.

Figure 8:
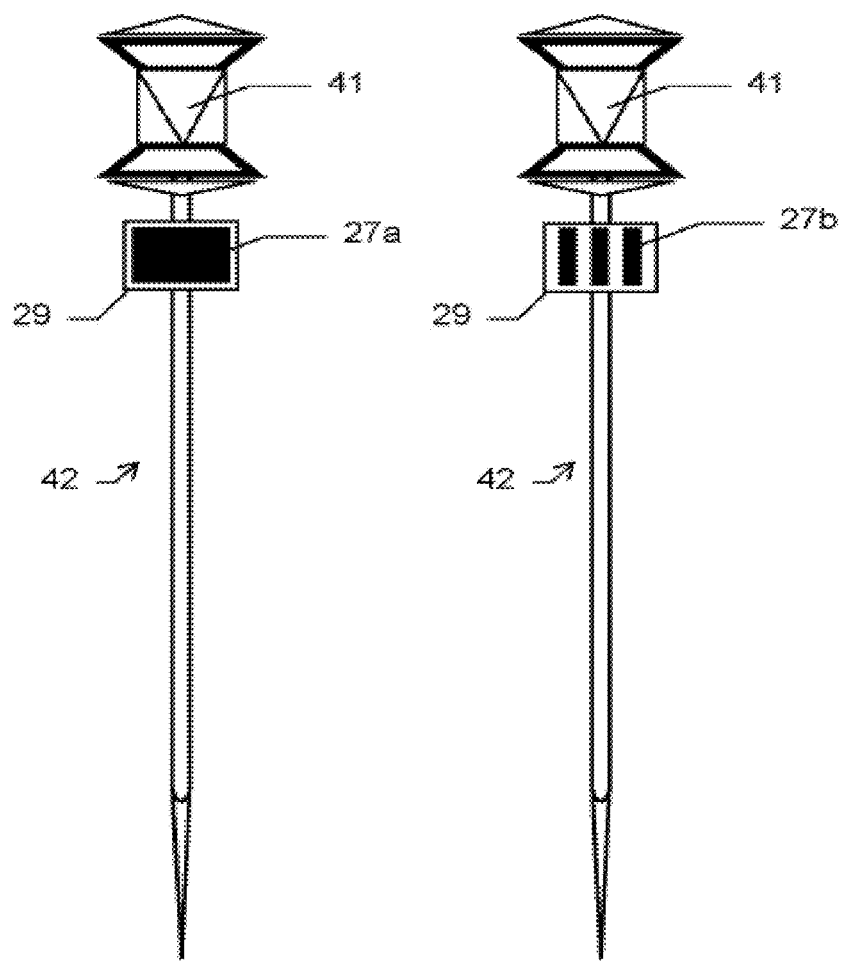
FIG. 8 shows two measuring rods each having a reflector and thermal coding elements.

FIG. 8 shows two measuring rods 42 each having a reflector 41, which can be configured e.g. as a prism. Furthermore, a coding element 29 is in each case arranged on the measuring rods 42, said coding element extending over part of the measuring rod 42. On the coding elements 29, by way of example, two different forms of a coding 27a and 27b applied thereon are shown. The coding forms 27a and 27b in this case each show dark regions on the coding elements 29 which can be temperature-regulated in a defined manner and can thus have a defined thermal coding partially or areally in specific forms 27a and 27b. By way of example, three thermal struts 27b or a rectangular area 27a or other geometrical figures can be provided on the coding elements 29. Using these different coding forms 27a and 27b, it is possible e.g. to facilitate a differentiation of target marks on a thermal image by means of image processing. An identification can then take place no longer solely on the basis of different temperatures of the target marks, but rather additionally (or alternatively) by means of the identification of the form 27a and 27b of the temperature-regulated regions. The target mark identified in a recorded thermal image on the basis of the defined temperature and/or form 27a, 27b thereof can be used together with its position in the thermal image in various ways. Firstly, an automatic target tracking of the identified target mark can be effected and in this case the sighting direction of the measuring station 1 can be constantly aligned with the target mark. Such a target tracking on the basis of a daylight image is described e.g. in EP 2 141 450. In this case, the measuring station is automatically aligned with a target and tracks the latter, wherein the target identification is effected by means of image processing of a previously acquired image of the environment. This system supports a target tracking and target acquisition by means of a laser beam directed onto a reflector and detected at the measuring device, in particular when the laser beam lies outside a detection range and a target tracking cannot be realized solely on the basis of the detection of a laser reflection.

According to the invention, for the purpose of target tracking, a thermal image of a terrain or of an environment can be acquired, in particular constantly, and a target mark that is temperature-regulated in a defined manner can be identified therein by means of image processing and a target can be tracked by means of an automatic and constant alignment of the measuring station according to the invention with the target mark or in accordance with a movement of the target mark in the thermal image. Such a target identification and tracking can be used in particular for supporting an automatic laser target tracking unit. By virtue of the additional use of thermal image information, a target to be sighted, e.g. in the case of an interruption of the laser light path, can thus be rapidly acquired anew.

Furthermore, a manual or automatic target seeking can take place on the basis of the temperature identification of the target mark by means of image processing on an acquired thermal image. In addition, by means of the position of the target mark identified in the thermal image, high-precision sighting of a target can take place automatically. For this purpose, firstly, by means of image processing on the basis of a temperature that is different with respect to the environment and/or on the basis of the geometrical form of the thermal coding, the position of a thermal coding element 29 can be determined exactly. For a high-precision sighting e.g. of a prism that is based thereon, the distance between the thermal coding and the reflector 41 may be known. This additional information makes it possible for the sighting unit of the measuring station to be aligned with the reflector directly manually or automatically and for the position thereof to be determined exactly.

What is claimed is:

1. A method for determining the coordinates and temperature information of a target point on a target object using a geodesic measuring device being a total station or a theodolite, the geodesic measuring device comprising:
    a base;
    a sighting device rotationally coupled with the base, wherein the sighting device is pivotable on a first axis and a second axis relative to the base of the geodesic measuring device in order to change the alignment thereof and the sighting device includes:
        an objective unit that defines an optical aiming axis;
        an electronic laser distance measuring unit configured for providing a distance measuring functionality for determining distances with respect to the target point; and
        a thermal imaging camera for acquiring a thermal image in the direction of the optical aiming axis;
    an angle measuring functionality for acquiring the alignment of the aiming axis; and
    a control unit for controlling the angle measuring functionality and the thermal imaging camera, the method comprising:
        acquiring a thermal image;
        obtaining temperature information from the thermal image automatically using image processing;
        deriving coordinates with respect to the target point on the target object from the angle measuring functionality and distance measuring functionality; and
        determining distances and angles of positions within the thermal image from the thermal image and the coordinates, wherein at least some of the positions within the thermal image are of the sighted target point, wherein distances and temperature information are linked to one another in pairs in such a way that they can be called up in a manner associated with one another,
        wherein coordinates of the sighted target point are stored in a manner correlated with the temperature information,
        wherein positions of the temperature information on the thermal image correspond to coordinates of the sighted target point defined by the alignment of the optical aiming axis.

2. The method as claimed in claim 1, wherein a target point on the target object acquired in the thermal image is measured on the basis of a temperature measurement criterion predefined depending on the temperature information which can be read out from the thermal image, wherein the optical aiming axis of the measuring device is aligned with the target point, wherein the position data of the target point are stored in a manner correlated with the temperature information.

3. The method as claimed in claim 2, wherein in order to define the temperature measurement criterion, the temperature information in the thermal image is converted into areas each representing a temperature range, wherein the areas are delimited with respect to one another by isotherms, and/or a center of a temperature range is determined.

4. The method as claimed in claim 2, wherein in order to define the temperature measurement criterion, the temperature information in the thermal image is converted into areas each representing a temperature range, wherein the areas are delimited with respect to one another by isotherms, and/or an area centroid is determined.

5. The method as claimed in claim 2, wherein measurement is effected along a path representing predetermined temperature information or a defined temperature profile.

6. The method as claimed in claim 5, wherein measurement is effected automatically with a predetermined point-to-point resolution and/or with a predetermined temporal separation of individual measurements.

7. The method as claimed in claim 5, wherein the measurement is effected along a path representing predetermined temperature information or a defined temperature profile along the isotherms, and/or constantly with respect to a point of the predetermined temperature information with respect to the center of the temperature range.

8. The method as claimed in claim 2, wherein a reference beam is guided along a reference path, wherein, during the guidance of the reference beam, at least one part of the reference path is perceptible on the object as a reference line visually and/or by means of a detector and the reference beam is guided on the basis of the temperature measurement criterion along the isotherms.

9. The method as claimed in claim 1, wherein:
    the temperature information and a corresponding daylight image are represented independently of one another and/or in a manner at least partly superimposed on an output unit;
    and/or acquired data and/or information are/is communicated to a controller, wherein the acquired data and/or temperature information are/is represented at the controller.

10. The method as claimed in claim 1, wherein coordinates with respect to the target point on the target object are determined and extracted and the coordinates are transmitted into a computer unit, wherein measurements of distances and angles in the acquired thermal image are carried out on the basis of the coordinates.

11. The method as claimed in claim 1, wherein coordinates with respect to the target point on the target object are determined and extracted and the coordinates are transmitted into a CAD system, wherein measurements of distances and angles in the acquired thermal image can be carried out on the basis of the coordinates.

12. The method as claimed in claim 1, wherein the sighting device includes a telescopic sight and the control unit controls the alignment of the sighting unit.

13. The method as claimed in claim 1, wherein a target point on the target object acquired in the thermal image is measured automatically on the basis of a temperature measurement criterion predefined depending on the temperature information which can be read out from the thermal image, wherein the optical aiming axis of the measuring device is aligned with the target point.

14. A geodesic measuring device for determining position data and temperature information of a target point on a target object, the geodesic measuring device being a total station or a theodolite comprising:
  a base;
  a sighting device rotationally coupled with the base, wherein the sighting device is pivotable on a first axis and a second axis relative to the base of the geodesic measuring device in order to change the alignment thereof and this sighting device includes:
    an objective unit that defines an optical aiming axis;
    an electronic laser distance measuring unit configured for providing a distance measuring functionality for determining distances with respect to the target point; and
    a thermal imaging camera for acquiring a thermal image in the direction of the optical aiming axis; and
    an angle measuring functionality for acquiring the alignment of the aiming axis; and
  a control unit for controlling the angle measuring functionality and the thermal imaging camera,
    wherein in the context of a thermal image measurement mode under the control of the control unit, as a result of the initiation of a measurement process, position data of the sighted target point which are determined, together with temperature information read out from the thermal image for the target point sighted using the aiming axis, are linked to one another in pairs in such a way that they can be called up in a manner associated with one another,
    wherein the position data of the sighted target point are stored in a manner correlated with the temperature information,
    wherein the temperature information is read from the thermal image automatically using image processing, and
    wherein a distance measurement is effected with the laser distance measuring unit along a path representing temperature boundaries determined by the thermal imaging camera or a defined temperature profile.

15. The total station or a theodolite as claimed in claim 14, wherein the sighting device includes a telescopic sight, the control unit for controlling the alignment of the sighting unit, and the position data of the target point are stored in a manner correlated with the temperature information by storage means.

16. The total station or a theodolite as claimed in claim 14, wherein the measuring device has a control functionality for performing the following automatically, in a thermal image measurement mode as a result of the initiation of a measurement process, position data of the sighted target point which are determined in this case, together with temperature information read out from the thermal image for the target point sighted using the aiming axis, are linked to one another in pairs in such a way that they can be called up in a manner associated with one another, wherein the position data of the target point are stored in a manner correlated with the temperature information.

17. The total station or a theodolite as claimed in claim 16 comprising image processing means, wherein the control functionality is designed in such a way that, when the control functionality is performed, wherein in order to define the temperature measurement criterion, the temperature information in the thermal image is converted into areas each representing a temperature range, wherein the areas are delimited with respect to one another by isotherms, and/or a center of a temperature range and/or an area centroid is determined.

18. The total station or a theodolite as claimed in claim 17 comprising a source of electromagnetic radiation including a laser beam source, for generating a reference beam and comprising guide means for guiding the reference beam along a reference path, wherein the control functionality is designed in such a way that, when the control functionality is performed, wherein the measurement is automatically effected along a path representing predetermined temperature information or a defined temperature profile along the isotherms, and/or constantly with respect to a point of the predetermined temperature information with respect to the center of the temperature range.

19. A system comprising a geodesic measuring device as claimed in claim 14 and a target mark, wherein the target mark has a predetermined thermal coding and/or a region of defined temperature and/or a defined geometric arrangement of temperature-regulated regions, wherein a position of the target mark on the thermal image acquired by the thermal imaging camera is determinable by means of an identification of the thermal coding by image processing.

20. The system as claimed in claim 19, wherein in the context of target tracking, the position of the target mark on the thermal image is assigned to the direction of the optical aiming axis of the measuring device and the control unit is designed for controlling the alignment of the sighting unit in such a way that the optical aiming axis is constantly aligned with the target mark.

21. A target mark for use with a system as claimed in claim 19, wherein the target mark has a temperature-regulating unit for the thermal coding of at least one part of the target mark.

22. A method for determining the position and temperature information of a target point on a target object using a geodesic measuring device being a total station or a theodolite, the geodesic measuring device comprising:
  a base;
  a sighting device rotationally coupled with the base, wherein the sighting device is pivotable on a first axis and a second axis relative to the base of the geodesic measuring device in order to change the alignment thereof and the sighting device includes:
    an objective unit that defines an optical aiming axis;
    an electronic laser distance measuring unit configured for providing a distance measuring functionality for determining distances with respect to the target point; and
    a thermal imaging camera for acquiring a thermal image in the direction of the optical aiming axis;
  an angle measuring functionality for acquiring the alignment of the aiming axis; and
  a control unit for controlling the angle measuring functionality and the thermal imaging camera, the method comprising:

determining a position of the sighted target point from the angle measuring functionality;
determining a temperature of the sighted target point from the thermal image using image processing and from the position of the sighted target;
linking the position of the sighted target point and the temperature of the sighted target point to one another in pairs in such a way that they can be called up in a manner associated with one another; and
storing the position data of the sighted target point in a manner correlated with the temperature information.

* * * * *